(12) United States Patent
Radel et al.

(10) Patent No.: US 11,009,640 B2
(45) Date of Patent: May 18, 2021

(54) TRANSMISSIVE AERIAL IMAGE DISPLAY

(71) Applicant: 8259402 CANADA INC., Dorval (CA)

(72) Inventors: Jason Carl Radel, Montreal (CA);
Fernando Petruzziello, Montreal (CA)

(73) Assignee: 8259402 CANADA INC., Dorval (CA)

( * ) Notice: Subject to any disclaimer, the term of this patent is extended or adjusted under 35 U.S.C. 154(b) by 132 days.

(21) Appl. No.: 16/100,938

(22) Filed: Aug. 10, 2018

(65) Prior Publication Data

US 2019/0049640 A1    Feb. 14, 2019

Related U.S. Application Data

(60) Provisional application No. 62/544,121, filed on Aug. 11, 2017.

(51) Int. Cl.
| | | |
|---|---|---|
| *G02B 27/01* | (2006.01) | |
| *G02B 5/30* | (2006.01) | |
| *G02B 27/14* | (2006.01) | |
| *G02B 27/09* | (2006.01) | |
| *G02B 30/00* | (2020.01) | |
| *G02B 30/56* | (2020.01) | |

(52) U.S. Cl.
CPC .......... *G02B 5/3025* (2013.01); *G02B 27/01* (2013.01); *G02B 27/0961* (2013.01); *G02B 27/14* (2013.01); *G02B 30/00* (2020.01); *G02B 30/56* (2020.01)

(58) Field of Classification Search
CPC ...................... G02B 27/01–0103; G02B 30/56
See application file for complete search history.

(56) References Cited

U.S. PATENT DOCUMENTS

| | | | |
|---|---|---|---|
| 2,562,077 A | 7/1951 | Winnek | |
| 4,509,837 A | 4/1985 | Kassies | |
| 4,973,132 A * | 11/1990 | McDonald | ........... G02B 5/3066 |
| | | | 359/13 |
| 5,572,363 A | 11/1996 | Fergason | |
| 5,621,572 A | 4/1997 | Fergason | |
| 6,024,455 A | 2/2000 | O'Neill et al. | |

(Continued)

FOREIGN PATENT DOCUMENTS

| | | |
|---|---|---|
| CA | 1070282 | 1/1980 |
| EP | 1459111 | 9/2004 |
| WO | 2005114268 | 12/2005 |

*Primary Examiner* — Christopher Stanford
(74) *Attorney, Agent, or Firm* — Benoit & Cote Inc.; Charles-André Caron

(57) ABSTRACT

There is described a display apparatus for producing an aerial image of an object. The display apparatus comprises a display acting as the object to be imaged. A first beam splitter or reflective polarizer receives light from the display and redirects at least a portion of the light to one or two retroreflectors. Lens arrays can be added onto the retroreflector(s) to reduce blur. A second beam splitter or reflective polarizer receives the light from the retroreflector(s) and produces the aerial image. The second beam splitter or reflective polarizer is aligned with a point of view of the viewer, thus defining a horizon of the field of view. An opaque surface extends below the horizon, and the first beam splitter or reflective polarizer, the first retroreflective sheeting and the display are located under the surface and therefore below the horizon, thus keeping the over-the-head space free of equipment.

16 Claims, 16 Drawing Sheets

(56) References Cited

U.S. PATENT DOCUMENTS

| | | | |
|---|---|---|---|
| 6,262,848 B1 * | 7/2001 | Anderson | G02B 27/0101 359/630 |
| 6,359,737 B1 * | 3/2002 | Stringfellow | G02B 27/0101 250/214 VT |
| 6,381,068 B1 * | 4/2002 | Harada | G02B 5/0215 359/443 |
| 6,774,869 B2 * | 8/2004 | Biocca | G02B 27/0172 345/8 |
| 7,298,496 B2 | 11/2007 | Hill | |
| 7,506,987 B2 | 3/2009 | Nilsen | |
| 7,585,596 B1 | 9/2009 | Johnson et al. | |
| 8,089,568 B1 * | 1/2012 | Brown | G02B 27/0172 349/11 |
| 8,287,127 B2 * | 10/2012 | Gao | G02B 30/26 353/7 |
| 8,300,314 B2 * | 10/2012 | Sugiyama | G02B 5/124 359/630 |
| 8,441,733 B2 * | 5/2013 | Kessler | G02B 27/0103 359/630 |
| 8,540,371 B2 * | 9/2013 | Sugiyama | G03B 21/28 353/10 |
| 8,657,453 B2 * | 2/2014 | Maekawa | G09F 19/16 359/528 |
| 8,773,329 B2 * | 7/2014 | Sugiyama | G02B 27/0101 345/7 |
| 9,052,777 B2 | 6/2015 | Holmgren et al. | |
| 9,110,236 B2 | 8/2015 | Saito et al. | |
| 9,453,947 B2 | 9/2016 | Arbabi et al. | |
| 9,740,004 B2 * | 8/2017 | Kessler | G02B 30/54 |
| 9,823,472 B2 * | 11/2017 | Kim | G02B 5/30 |
| 10,001,653 B2 * | 6/2018 | Nakao | G09G 5/026 |
| 10,001,654 B2 * | 6/2018 | Joseph | G02B 5/124 |
| 10,031,368 B2 * | 7/2018 | Otani | G02B 27/28 |
| 10,120,188 B2 * | 11/2018 | Matsuzaki | G02B 27/10 |
| 10,209,674 B2 * | 2/2019 | Suginohara | G03H 1/0005 |
| 10,254,551 B2 * | 4/2019 | Kishigami | G02B 5/30 |
| 10,324,336 B2 * | 6/2019 | Narushima | G02B 5/30 |
| 2007/0217018 A1 * | 9/2007 | Fredriksson | G02B 27/0103 359/631 |
| 2008/0192356 A1 | 8/2008 | Hamagishi | |
| 2008/0198459 A1 * | 8/2008 | Fergason | G02B 27/0101 359/529 |
| 2009/0009594 A1 * | 1/2009 | Kawai | G02B 30/52 348/54 |
| 2009/0153959 A1 | 6/2009 | Tao et al. | |
| 2009/0168187 A1 | 7/2009 | Woodgate et al. | |
| 2012/0026425 A1 * | 2/2012 | Kumaki | B60K 35/00 349/62 |
| 2012/0099199 A1 | 4/2012 | Vasylyev | |
| 2013/0265646 A1 * | 10/2013 | Sakai | G02B 27/0101 359/631 |
| 2014/0267402 A1 * | 9/2014 | Hing | G02B 27/01 345/633 |
| 2016/0004081 A1 * | 1/2016 | Kasahara | G02B 27/0101 345/633 |
| 2016/0147074 A1 * | 5/2016 | Kobayashi | G02B 3/0006 345/7 |
| 2017/0045740 A1 * | 2/2017 | Hirata | G02B 27/01 |
| 2017/0108330 A1 | 4/2017 | Johnson et al. | |
| 2017/0146703 A1 | 5/2017 | Powell et al. | |
| 2018/0373030 A1 * | 12/2018 | Kusanagi | G01C 21/365 |
| 2019/0285904 A1 * | 9/2019 | Kim | H04N 13/302 |

\* cited by examiner

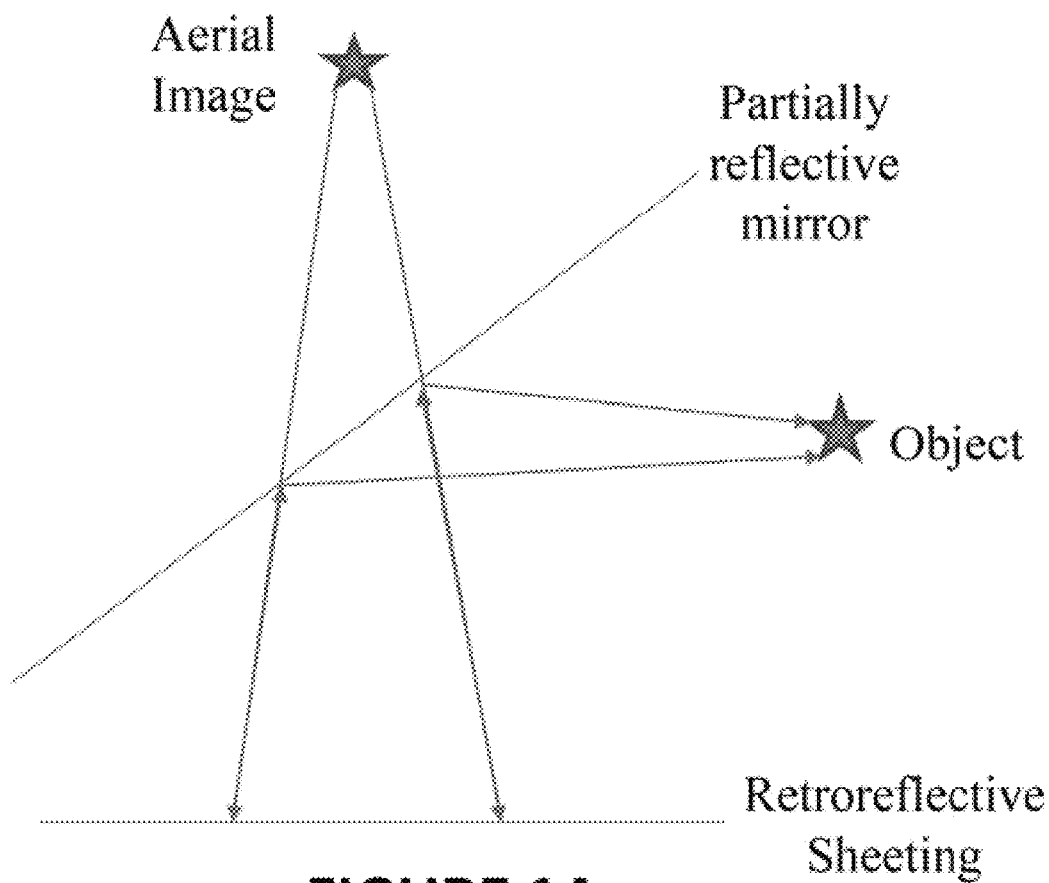
**FIGURE 1A
PRIOR ART**
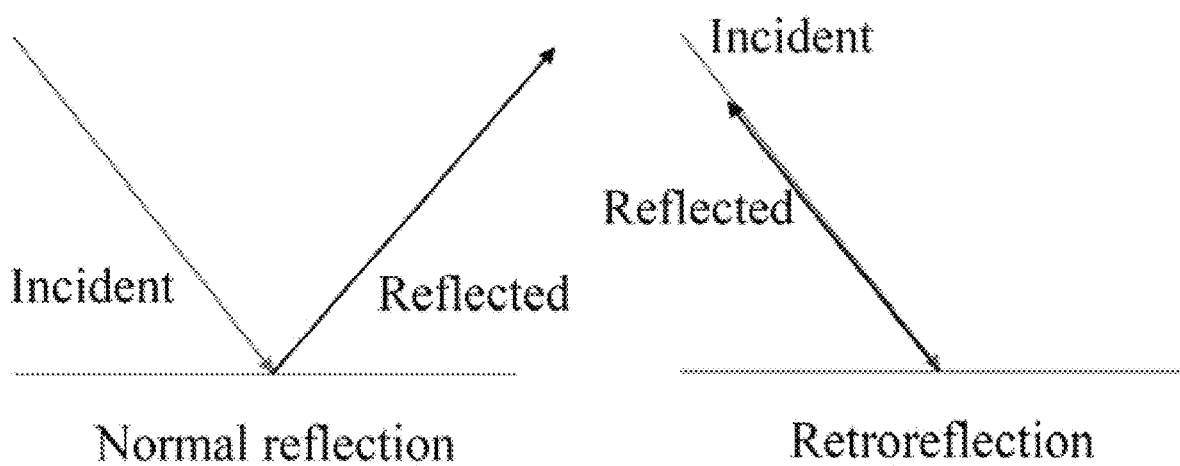
**FIGURE 1B
PRIOR ART**
**FIGURE 1C
PRIOR ART**

Diffraction and imperfections in retroreflector cause angular error in retroreflection Diffraction and spatial errors in retroreflection cause the reconstructed image to be blurred/low resolution Retroreflected light parallel to incident light small retroreflectors (and/or large lens)

large retroreflectors (and/or small lens)

TRANSMISSIVE AERIAL IMAGE DISPLAY

CROSS-REFERENCE TO RELATED APPLICATIONS

This application claims benefit of U.S. provisional patent application 62/544,121, filed Aug. 11, 2017, which is hereby incorporated herein by reference in its entirety.

BACKGROUND

(a) Field

The subject matter disclosed generally relates to aerial image displays. More specifically, it relates to the use of retroreflectors for aerial image displays.

(b) Related Prior Art

An aerial image is an image appearing as floating in the air, as shown in FIG. 1A. Aerial images can be produced by an aerial image display apparatus comprising a retroreflector.

Retroreflection is the effect, provided by a surface or an object, of reflecting incident light rays at a reflection angle equal to the incident angle (both in magnitude and sign). The incident light ray is represented by an incident light ray vector, as shown in FIGS. 1B-1C. Normally, the reflected light ray vector would be expected to be the vector for which the normal of the surface would bisect the incident light ray vector and the reflected light ray vector, i.e., the angle of reflection is equal in absolute value to the incident angle, but extends in a mirrored direction with respect to the normal of the surface (i.e., the angle with the normal has the same magnitude but an opposite sign), as shown in FIG. 1B. Retroreflection means that the vectors of the incident and reflected light rays are the same. They can be substantially coincident in space, but normally exhibit a small translational offset due to the size of the retroreflector while still having the same direction.

A retroreflector is either an engineered surface or an object (e.g., a "corner" made of three perpendicular mirrors) for which an incoming light ray is reflected into a reflected light ray in the same direction as the incoming light ray, as shown in FIG. 1C.

A retroreflector can be used in combination with a partially reflective mirror to produce an image of an object, as shown in FIG. 1A. The image appears as floating in the air, hence the expression "aerial image" to label a display producing this type of image.

Some displays for producing aerial images have been described, for example in U.S. Pat. No. 4,509,837.

The typical aerial image display apparatus, as used in technological demonstrations for the public, is shown in FIG. 2. This aerial image display apparatus comprises a display or screen acting as an object, e.g., a LCD screen that can produce content that will be imaged by the other components of the aerial image display apparatus. The viewer has their eyes directed toward the retroreflector (RR), perpendicularly to the surface of the retroreflector. A beam splitter (BS) or reflective polarizer (RP) is provided in between, at a 45° inclination with respect to the axis normal from the retroreflector and directed toward the viewer. The screen that will be imaged (forming the image I) needs to be positioned perpendicularly to the retroreflector and extending from one edge thereof to the edge of the beam splitter or reflective polarizer, such that the screen, the retroreflector and the beam splitter or reflective polarizer form a right triangle.

FIG. 3 illustrates an aerial image display according to the prior art. This aerial image display apparatus is transmissive, i.e., an additional image source can be provided to add complexity to the overall image being viewed by the viewer. This allows the aerial image to be produced over another screen, object, etc.

SUMMARY

When referring to the whole apparatus, which includes a display and various optical components, the terms "aerial image display apparatus" (or "display apparatus") will be used. The term "display", alone, will refer to the component which makes up the object to be imaged, usually a screen (e.g., a LCD screen), but can be any other type of display that can be imaged, including for example real images such as a white screen for projection onto which visual contents are projected, or even a poster.

According to an aspect of the invention, there is provided a display apparatus for producing, in a field of view of a viewer, an aerial image of an object, the display apparatus comprising:
  a display acting as the object to be imaged;
  a first beam splitter or reflective polarizer receiving light from the display and redirecting at least a portion of the light;
  a first retroreflective sheeting for performing a retroreflection of the light redirected by the first beam splitter or reflective polarizer;
  a second beam splitter or reflective polarizer for receiving the light retroreflected by the first retroreflective sheeting and which produces the aerial image, the second beam splitter or reflective polarizer being aligned with a point of view of the viewer, thus defining a horizon of the field of view; and
  a surface extending below the horizon,
  wherein the first beam splitter or reflective polarizer, the first retroreflective sheeting and the display are located under the surface and therefore below the horizon.

According to an embodiment, there is further provided a lens array installed over the first retroreflective sheeting.

According to an embodiment, there is further provided a second retroreflective sheeting, wherein the first beam splitter or reflective polarizer is for transmitting light from the screen display to the second retroreflective sheeting and for directing light from the second retroreflective sheeting to the second beam splitter or reflective polarizer.

According to an embodiment, there is further provided a lens array installed over the first retroreflective sheeting and the second retroreflective sheeting.

According to an embodiment, the surface is opaque on at least a portion thereof to block a portion of the field of view to define a hidden portion thereunder, wherein the display is located in the hidden portion.

According to an embodiment, the surface comprises an opening in an optical path between the first beam splitter or reflective polarizer and the second beam splitter or reflective polarizer, the opening defining a proximal portion of the surface and a distal portion of the surface with respect to the point of view of the viewer, wherein the display is installed under the proximal portion of the surface, wherein the first beam splitter or reflective polarizer and the second beam splitter or reflective polarizer are parallel.

According to an embodiment, there is further provided a mirror in an optical path between the display and the first beam splitter or reflective polarizer for reflecting the light from the display, wherein the display is installed substantially horizontally under the proximal portion of the surface.

According to an embodiment, the second beam splitter or reflective polarizer is a conical or cylindrical beam splitter.

According to an embodiment, the first beam splitter or reflective polarizer is a conical or cylindrical beam splitter.

According to an embodiment, the first beam splitter or reflective polarizer is a spherical beam splitter and the second beam splitter or reflective polarizer is a spherical beam splitter.

According to an embodiment, the surface comprises an opening in an optical path between the first beam splitter or reflective polarizer and the second beam splitter or reflective polarizer, the opening defining a proximal portion of the surface and a distal portion of the surface with respect to the point of view of the viewer, wherein the display is installed under the distal portion of the surface, wherein the first beam splitter or reflective polarizer and the second beam splitter or reflective polarizer are perpendicular.

According to an embodiment, there is further provided a mirror in an optical path between the display and the first beam splitter or reflective polarizer for reflecting the light from the display, wherein the display is installed substantially horizontally under the surface.

According to an embodiment, the surface is substantially parallel to the horizon and comprises a bezel that is inclined and extends away from the horizon for hiding the display from the point of view of the viewer.

According to an embodiment, the display acting as the object to be imaged is a physical object or viewing device that can display 3D imagery, in order to create a three dimensional aerial image.

According to another aspect of the invention, there is provided a method for producing, in a field of view of a viewer, an aerial image of an object, the method comprising:
aligning a second beam splitter or reflective polarizer with a point of view of the viewer, thus defining a horizon of the field of view
providing a display acting as the object to be imaged under an opaque surface extending below the horizon;
using a first beam splitter or reflective polarizer located below the opaque surface, receiving light from the display and redirecting at least a portion of the light;
using a first retroreflective sheeting located below the opaque surface, performing a retroreflection of the light redirected by the first beam splitter or reflective polarizer;
using the second beam splitter or reflective polarizer, receiving the light retroreflected by the first retroreflective sheeting and producing the aerial image.

According to an embodiment, there is an additional step of correcting the retroreflection using a lens array installed over the first retroreflective sheeting.

According to an embodiment, there is an additional step of using a second retroreflective sheeting to further perform the retroreflection, wherein the first beam splitter or reflective polarizer is for transmitting light from the screen display to the second retroreflective sheeting and for directing light from the second retroreflective sheeting to the second beam splitter or reflective polarizer.

According to an embodiment, there is an additional step of correcting the retroreflection using a lens array installed over the first retroreflective sheeting and the second retroreflective sheeting.

According to an embodiment, the display acting as the object to be imaged is a physical object or viewing device that can display 3D imagery, in order to create a three dimensional aerial image.

BRIEF DESCRIPTION OF THE DRAWINGS

Further features and advantages of the present disclosure will become apparent from the following detailed description, taken in combination with the appended drawings, in which:

FIG. 1A is a schematic diagram illustrating the principle of operation of an aerial image display using a retroreflector according to the prior art;

FIGS. 1B-1C are schematic diagrams comparing the principle of operation of a normal reflector and of a retroreflector according to the prior art;

It will be noted that throughout the appended drawings, like features are identified by like reference numerals.

DETAILED DESCRIPTION

Figure 2:
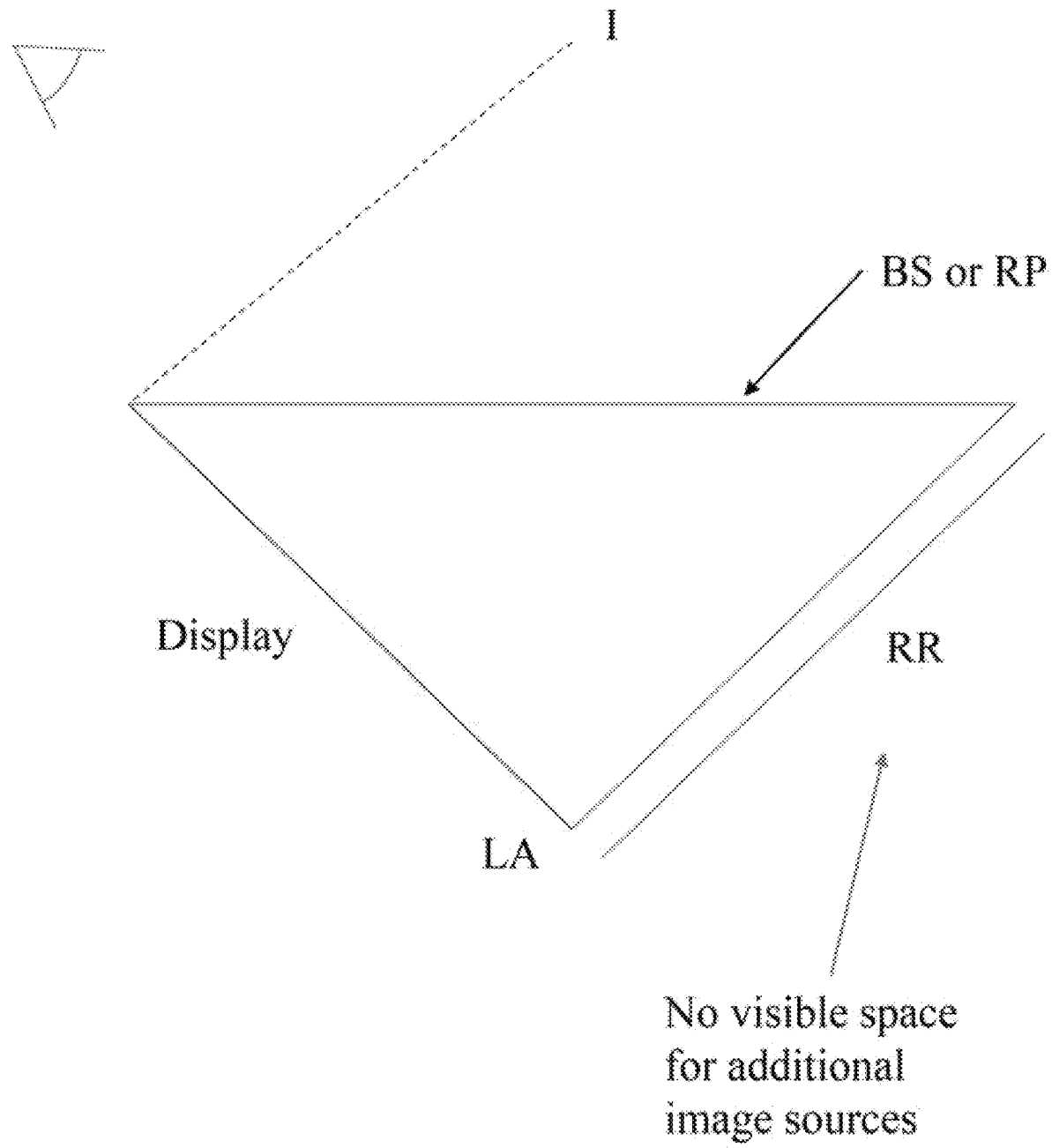
FIG. 2 is a schematic diagram illustrating a typical aerial image display using a retroreflector, according to the prior art.

The typical aerial image display apparatus of FIG. 2 unfortunately suffers from low image quality, since image resolution is low and the result is unaesthetic. The aerial image appears blurry. Moreover, this typical aerial image display apparatus does not allow adding another image source for the viewer, relying only on the display or screen (such as a LCD screen) to act as the original object to be imaged. Moreover, the image is produced with an inclination with respect to the viewer, as shown in FIG. 2, preventing the viewer from viewing the image vertically. Changing the angle of the apparatus of FIG. 2 can attenuate this problem, but this would make the original display plainly visible to the viewer, and the image would be mixed with the original display, resulting in a confusing combination.

Figure 3:
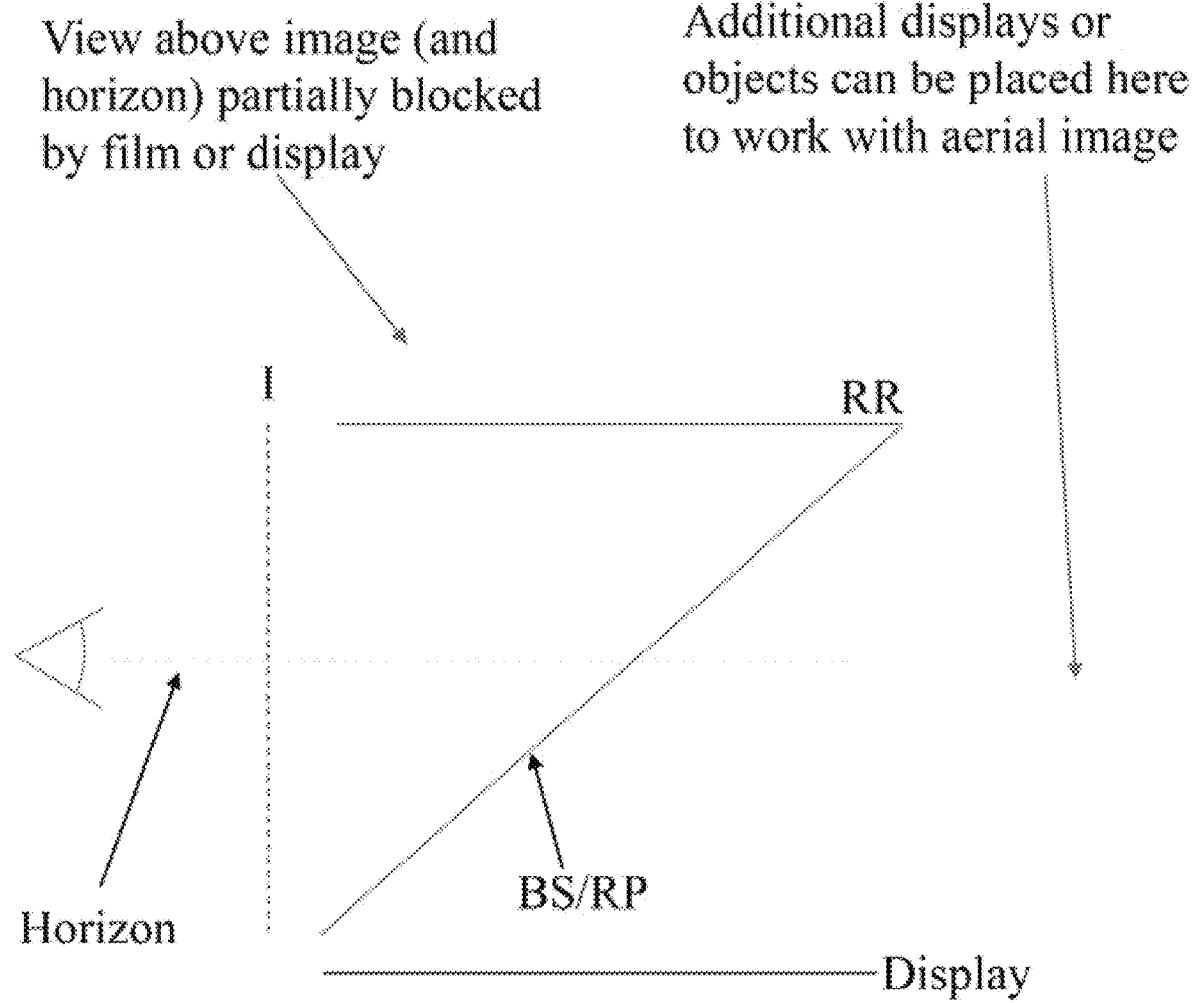
FIG. 3 is a schematic diagram illustrating another aerial image display using a retroreflector placed above the image, according to the prior art.

The aerial image display apparatus of FIG. 3 also suffers from poor image quality. Moreover, it is bulky and therefore inconvenient in some environments. Finally, again, the original screen is visible to the viewer, which can be confusing and disturbs the immersion.

There is described below, starting with FIG. 4, an aerial image display apparatus 10 for producing an aerial image I, the aerial image display apparatus 10 comprising retroreflectors RR. Display apparatuses from the prior art have been identified as lacking image quality as they do not provide sufficient reflection to have intense and sharp aerial images. Moreover, prior art aerial image display apparatuses fail to use more appropriate numbers, configurations and types of beam splitters or reflective polarizers to improved aerial image quality. The aerial image display apparatus 10 described below is advantageous in that it provides two beam splitters BS or reflective polarizers RP instead of the usual one, the configuration of which ensures brighter and sharper images.

Aerial image display apparatuses from the prior that are transmissive, i.e., that allow placing another image source behind the aerial image that will be viewable for the user in addition to the aerial image, are also bulky. It has been identified that bulkiness of these display apparatuses is related to the fact that the display (or screen) and the retroreflector are always positioned in opposite positions with respect to the field of view of the user; if the LCD screen (as an example of display) is below the field of view of the user (i.e., under the horizon), the retroreflector needs to be placed above this field of view (i.e., above the horizon), or vice versa. It means the area over the field of view of the viewer always occupied in prior art display apparatuses. Having bulky over-the-head equipment is not always appreciated, as the room may lack facilities for making this configuration possible, e.g., the ceiling being too low or not suited for mounting hanging equipment. In some cases, it may be preferable to have this area free of equipment to ensure a proper user experience with the aerial image display. More simply, there may also be space limitation or a preference for compactness, and therefore more compact equipment for the aerial image display apparatus is wanted.

This contemplated compactness is provided by embodiments of the aerial image display apparatus 10 described below. The area above the field of view of the viewer is freed from the equipment usually placed there for transmissive displays, giving new opportunities. This configuration in which all equipment is on the same side of the horizon (e.g., everything below the field of view) is made possible in the various embodiments described below by providing both the LCD screen 50 (also known as a display) and retroreflector(s) RR below a tabletop surface 80, or more generally by providing all equipment on the same side of a surface that limits the field of view of the viewer.

The uppermost piece of equipment (or alternatively, lowermost) is a reflective polarizer or beam splitter positioned at the horizon, i.e., the field of view, for imaging; all other pieces of equipment are installed below this reflective polarizer. In other words, the reflective polarizer defines a horizon of the field of view, which the level of the rendered image, and all other optical elements and the image source (i.e., the display forming the object to be imaged) are on the same side of the horizon of the field of view, preferably below it.

The "horizon" is a plane that can be formally defined as the plane for which the normal defining the plane is a vector product of 1) the line between a center of the optical component (reflective polarizer or beam splitter) producing the aerial image and an expected location of the eyes of the viewer and 2) an interocular vector (i.e., the line between the two eyes) representing the orientation of the viewer's head. Typically both are horizontal and the "horizon" as defined herein is also horizontal. Both the viewer's head position and orientation can be estimated by assuming the viewer is at the expected position imposed by a viewer's seat, i.e., the head of the viewer is assumed to be above the seat and the orientation is assumed to be horizontal. All equipment is located on the same side of the "horizon" plane, typically below, except the imaging component which is located directly on the horizon plane. Advantageously, an opaque surface is provided just below the horizon to hide all other parts of equipment that are located beneath it.

Figure 4:
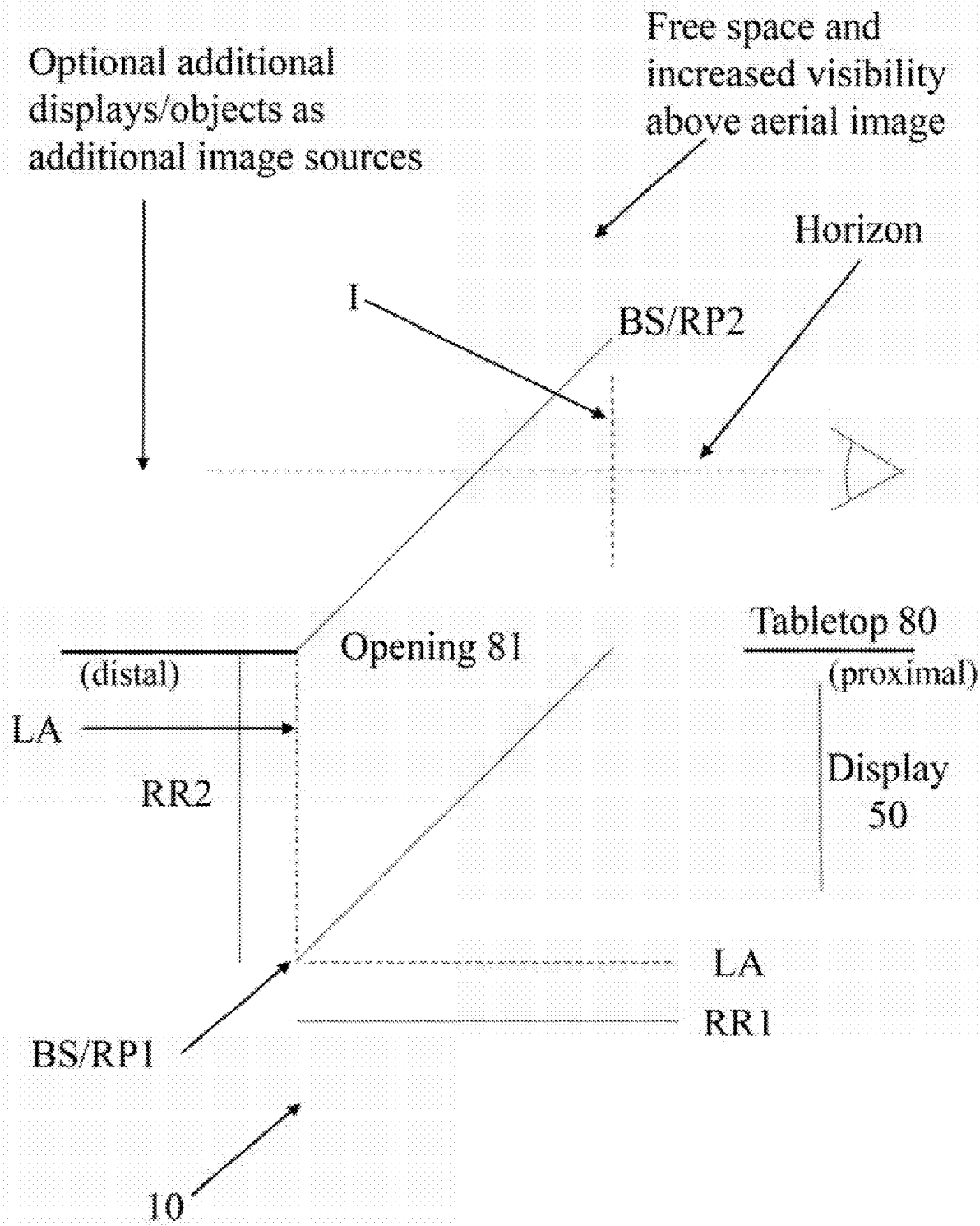
FIG. 4 is a schematic diagram illustrating an embodiment of an aerial image display comprising two retroreflectors and two beam splitters or reflective polarizers.

FIG. 4 illustrates an embodiment of the aerial image display apparatus 10. The aerial image display apparatus 10 is for producing an aerial image I to be viewed by a viewer, which is an image of the original object (i.e., display 50) rendered by the optical components of the aerial image display apparatus 10. There is no opaque structure behind the aerial image I, and therefore the aerial image display apparatus 10 is a transmissive display with additive image source imaging. Optionally, additional objects or displays can be provided behind the image, the term "behind" meaning opposite the viewer with respect to the aerial image I, making the image sources additive.

The object on which the aerial image I is based can be a screen display, such as a LCD screen 50. The LCD screen 50 is preferably hidden from the viewer. According to the embodiment shown in FIG. 4, the LCD screen 50 is positioned under a tabletop surface 80 over which the viewer's viewing location is situated. Alternatively, a physical object or viewing device that can create 3D imaging could be used in this configuration. If a 3D screen or a similar object is used as the object to be imaged, the aerial image that is produced can also be three-dimensional.

The tabletop surface 80 can serve as a working table for the viewer, and equipment such keyboards, buttons, screens, handles, etc., can be provided on the tabletop surface 80. The tabletop surface 80 can also be at least partially free of such equipment components, to allow the viewer to lay an object on the at least partially available portion of the tabletop surface 80.

The tabletop surface 80 extends in a generally horizontal plane, although irregularities of shape are possible. The tabletop surface 80 should extend below the eye level of the viewer. The tabletop surface 80 should be substantially opaque to the eyes of the viewer, thus defining a hidden portion thereunder, where the hidden portion is defined with respect to the expected point of view of the viewer. As a result, the tabletop surface 80 blocks the view and provides a vertical limitation of the actual field of view of the viewer, i.e., a solid angle defined by the opaque tabletop surface 80 becomes hidden from the expected point of view of the viewer. In other words, the bottom of the field of view of the viewer is occupied and blocked by the tabletop surface 80 such that any object or equipment found below the tabletop surface 80 is hidden from the viewer when the viewer is in a normal and operational viewing position. The expected point of view aligns with the second beam splitter or reflective polarizer, BS/RP2 to define the field of view horizon and under (or above) which all the other pieces of equipment are located. Therefore, when the viewer is installed at the expected operational position, the tabletop surface 80 defines a solid angle from the viewer's perspective under which the objects positioned at this place are hidden from the viewer. The tabletop surface 80 may have discontinuities on its surface, as shown in FIGS. 4-12, wherein a large gap or opening 81 (identified in FIG. 4) is provided below the second beam splitter or reflective polarizer, BS/RP2, to let the light escape and reach the second beam splitter or reflective polarizer, BS/RP2, for image generation. However, globally, the tabletop surface 80 forms a surface in space that blocks a bottom portion of the field of view of the viewer and both the LCD screen 50 and retroreflectors RR are provided on the same side of the tabletop surface 80 hidden to the viewer. This avoids having to provide any equipment (screen or retroreflector) in the over-the-head area in the room comprising the aerial image display apparatus 10, leaving space for other equipment or leaving this space free for greater convenience. Advantageously, the LCD screen 50 is also hidden from the viewer (i.e., installed in the hidden portion below the tabletop surface 80), thereby preventing any confusion and not disturbing the immersion provided by the aerial image.

The tabletop surface 80 comprises an opening 81 which is an opening in the optical path between the first beam splitter or reflective polarizer, BS/RP1 and the second beam splitter or reflective polarizer, BS/RP2. The opening defines a portion of the tabletop surface 80 that is proximal with respect to the viewer's point of view, and another portion that is distal with respect to the viewer's point of view. Depending on the embodiment, the display 50 can be located in the hidden portion defined by either the proximal portion or the distal portion of the tabletop surface 80. The first beam splitter or reflective polarizer, BS/RP1 and the second beam splitter or reflective polarizer, BS/RP2 are then arranged depending on the location of the display 50, i.e., respectively parallel (when the display is proximal) or perpendicular (when the display is distal). If the first beam splitter or reflective polarizer, BS/RP1 and the second beam splitter or reflective polarizer, BS/RP2 are curved, the term "parallel" means that they extend in the same direction overall.

Contrarily to the prior art displays, which have only one beam splitter, two beam splitters BS or reflective polarizers RP are provided, as shown in the embodiment of the invention of FIG. 4. A first one of the beam splitters or reflective polarizers, BS/RP1, is used to reflect a first fraction of the light emitted from the LCD screen 50 to a first retroreflector RR1 and transmit a second fraction of the light emitted from the LCD screen to a second retroreflector RR2, and then transmit the retroreflected light from the first retroreflector RR1 and reflect the retroreflected light from the second retroreflector RR2, toward a second one of the beam splitters or reflective polarizers, BS/RP2. The second one of the beam splitters or reflective polarizers, BS/RP2, reflects the light received from the first one of the beam splitters or reflective polarizers, BS/RP1, toward the viewer and thus forms an aerial image I in the field of view horizon, between the expected point of view of the viewer and the imaging or "second one" of the beam splitters or reflective polarizers, BS/RP2. The second one of the beam splitters or reflective polarizers, BS/RP2, is partially transparent to let light through from behind it in order to additively combine images, as mentioned above, with a secondary source placed behind the second one of the beam splitters or reflective polarizers, BS/RP2, where "the term "behind" means in the field of view of the horizon and opposite the expected point of view with respect the second one of the beam splitters or reflective polarizers, BS/RP2.

Figure 5:
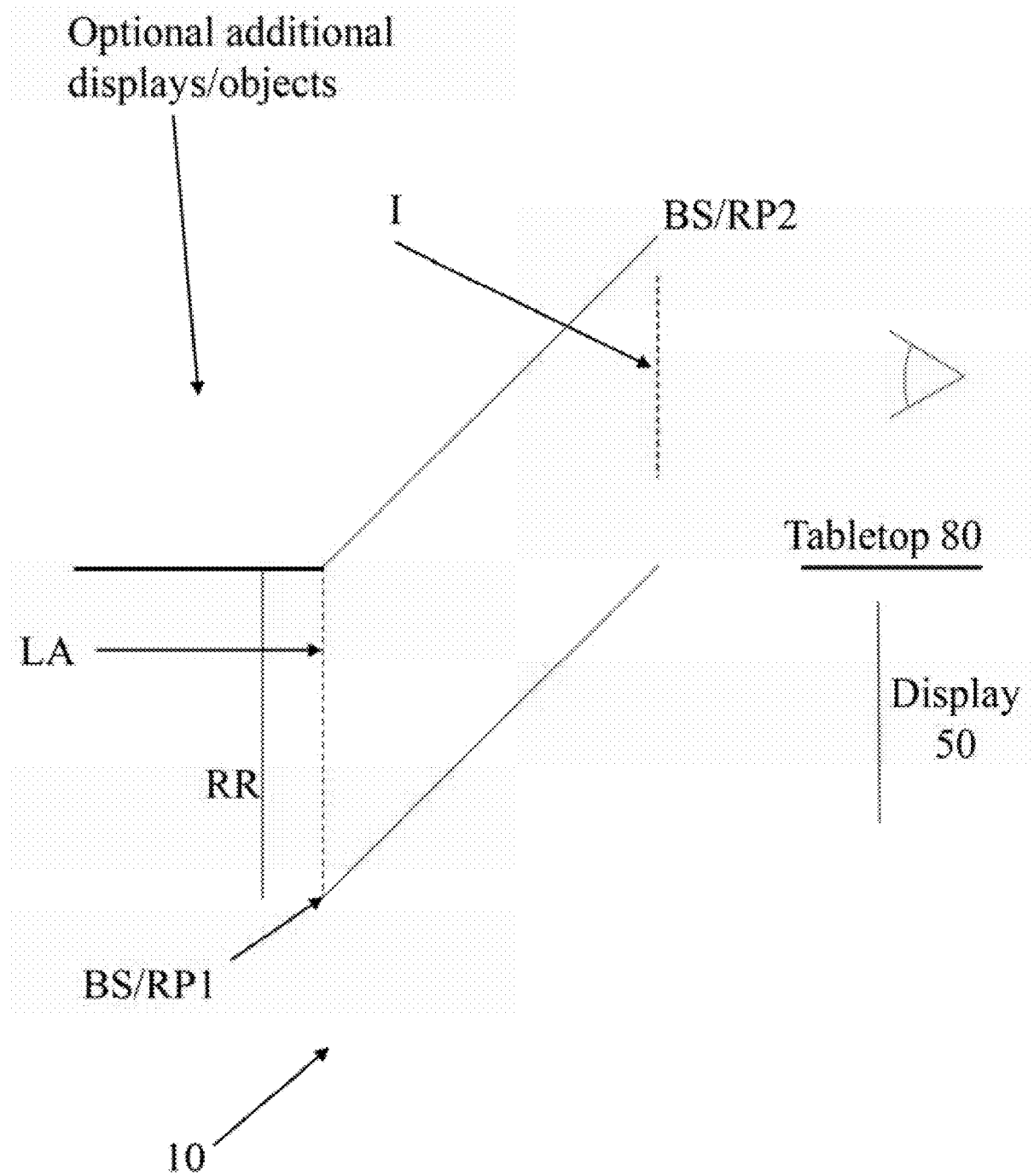
FIG. 5 is a schematic diagram illustrating an embodiment of an aerial image display comprising one retroreflector and two beam splitters or reflective polarizers.

Advantageously, the embodiment of FIG. 4 comprises two retroreflectors RR which retroreflect the light that was reflected (first retroreflector RR1) or transmitted (second retroreflector RR2) by the first beam splitter or reflective polarizer, BS/RP1, thereby increasing (i.e., substantially doubling) light intensity of the aerial image I compared to a situation in which only one retroreflector RR is used, as shown for example in FIG. 5.

Reflective polarizers and beam splitters provide the same effect and any one of them can be used to build the aerial image display apparatus 10. However, reflective polarizers have the advantage of not causing a loss in total brightness when a plurality of them is provided, since light polarity of different sources can be adjusted to avoid partial transmission (i.e., loss) at each interface.

In any case, the use of a second beam splitter or reflective polarizer, compared to prior art displays in which only one is provided, is advantageous in that it increases image resolution and brightness and allows the aerial image display apparatus 10 to have a configuration in which all retroreflectors RR and LCD screen 50 are hidden from the field of view of the viewer and on the same side (usually below) the field of view to keep the overhead area free from bulky equipment.

According to an embodiment of the aerial image display apparatus 10, a lens array LA is advantageously installed over a retroreflector RR (and possibly over each one of the retroreflectors RR if there is more than one). This is used for greater clarity, making the aerial image I a more accurate representation of the original object (i.e., the LCD screen). This will be discussed in detail further below, in relation with FIGS. 13A to 15B.

Figure 6:
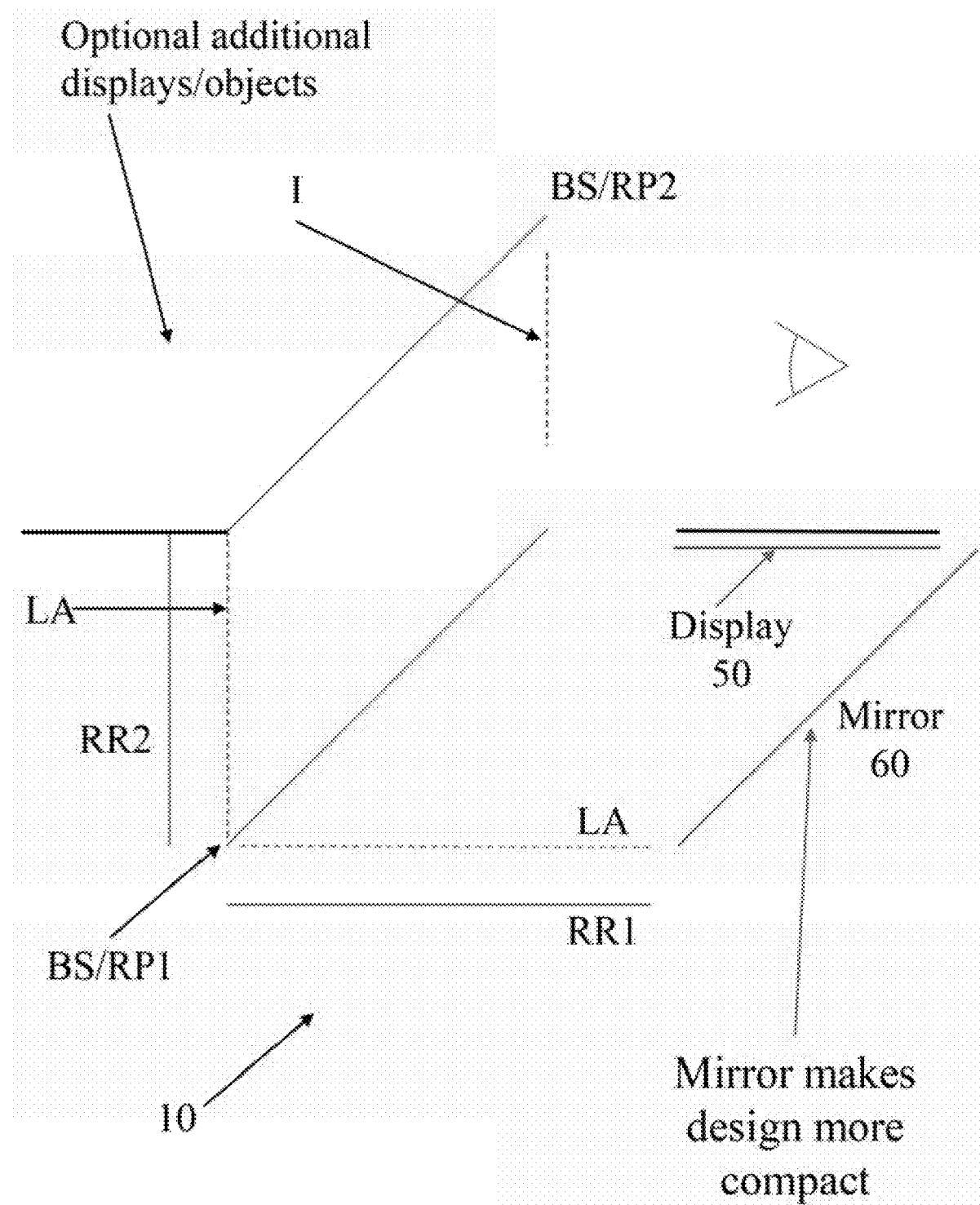
FIG. 6 is a schematic diagram illustrating an embodiment of an aerial image display comprising two retroreflectors and two beam splitters or reflective polarizers, and further comprising a mirror to make the display more compact.

In FIG. 6, there is shown another embodiment of the aerial image display apparatus 10. This embodiment is similar to the one illustrated in FIG. 4, although the LCD screen 50 is installed parallel to the tabletop surface, right below this surface. A mirror 60 is diagonally positioned below the LCD screen 50, at a 45° angle with the LCD screen and parallel to the first beam splitter or reflective polarizer, BS/RP1, the mirror 60 having a reflective surface facing, in an inclined fashion, the LCD screen 50 for reflecting what is displayed in the LCD screen 50 toward the first beam splitter or reflective polarizer, BS/RP1, to obtain the same effect as in FIG. 4. This design is useful in that it is more compact than in FIG. 4. The inclined mirror 60 leaves space below the tabletop surface 80, for example if the person stands or sits in front of the table, in which case their feet and possibly their legs will be able to fit under the back of the mirror in the free space below the tabletop surface 80, or other useful equipment may be installed there.

Figure 7:
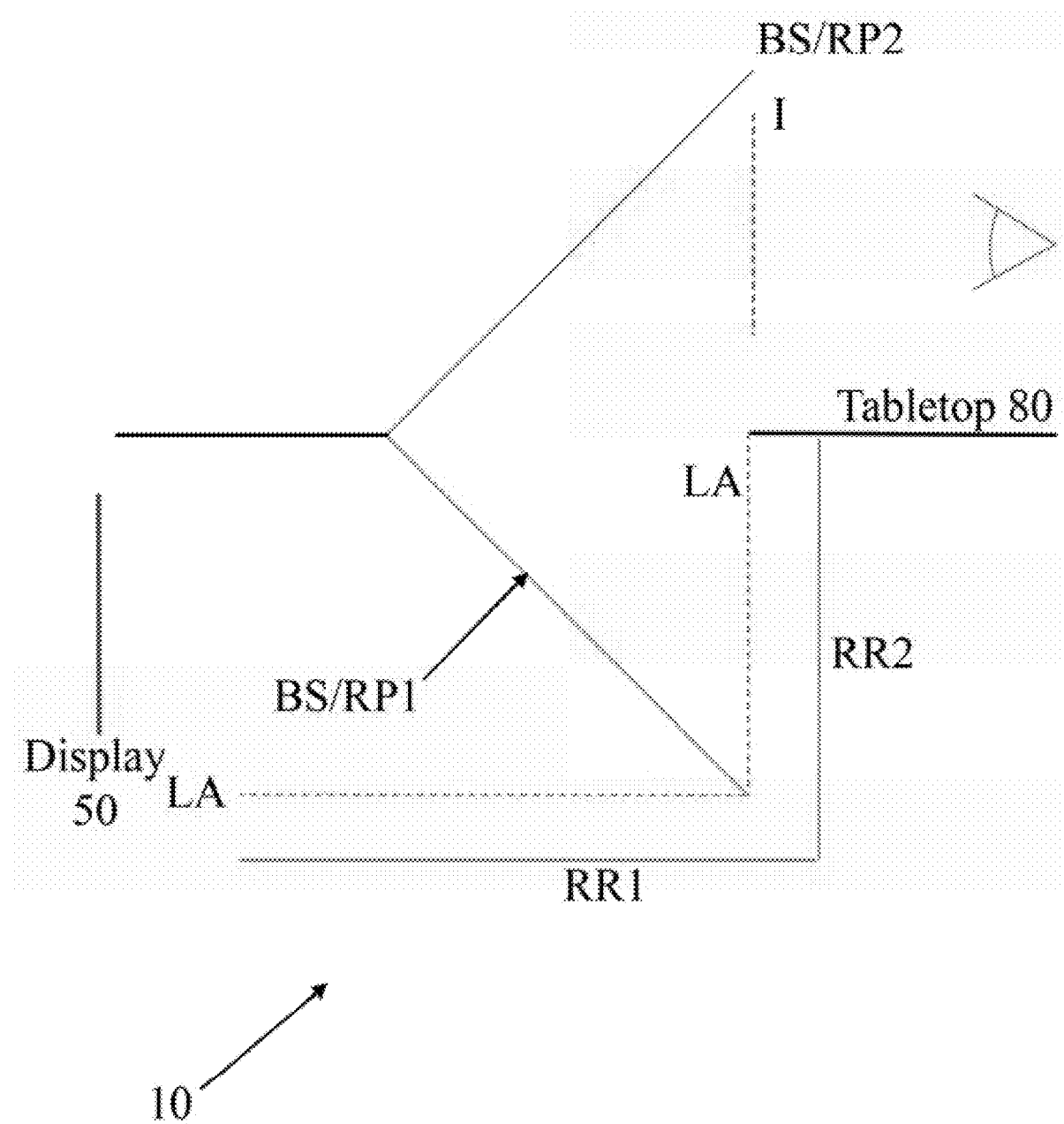
FIG. 7 is a schematic diagram illustrating another embodiment of an aerial image display comprising two retroreflectors and two beam splitters or reflective polarizers.

In FIG. 7, the LCD screen 50 is rather installed on a side opposite the viewer. Because the LCD screen 50 is positioned on that side, the second retroreflector RR2 of FIG. 4 needs to be positioned under the tabletop surface 80, still perpendicular to the first retroreflector RR1 which remains in the same place as in previously described embodiments (i.e., horizontal and under both beam splitters). In this embodiment, both the second retroreflector RR2 and the LCD screen 50 are interchanged in comparison with the embodiment of FIG. 4, and therefore the first beam splitter or reflective polarizer, BS/RP1, needs to be mirrored over itself to be able to redirect the light coming from the LCD screen 50 toward the first retroreflector RR1 and the light coming from the second retroreflector RR2 toward the second beam splitter or reflective polarizer, BS/RP2.

Figure 8:
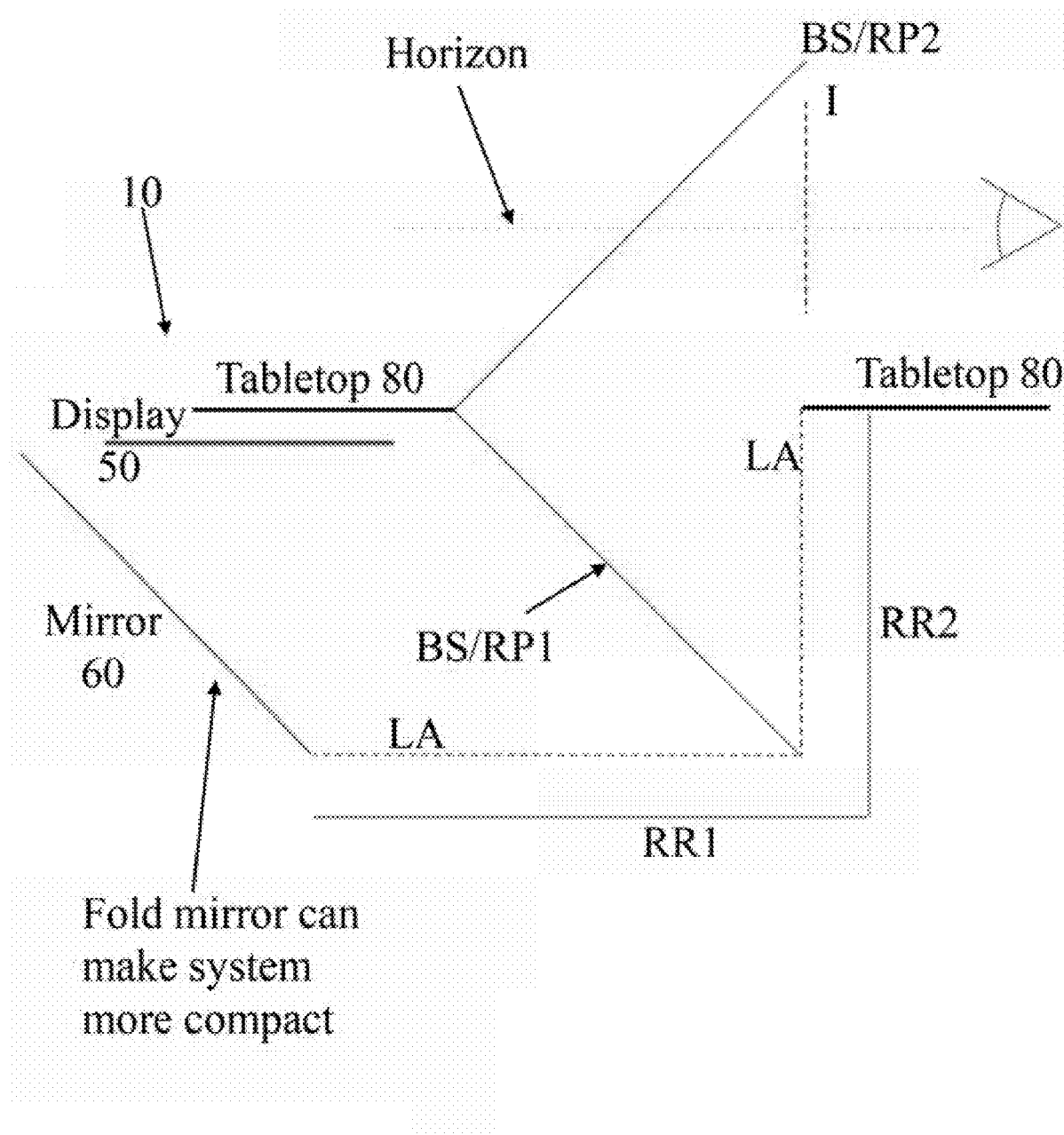
FIG. 8 is a schematic diagram illustrating another embodiment of an aerial image display comprising two retroreflectors and two beam splitters or reflective polarizers, and further comprising a mirror to make the display more compact.

Similarly, the vertically positioned LCD screen 50 in the embodiment shown in FIG. 8 can be positioned horizontally under a portion of the tabletop surface 80 located distally from the viewer. A 45°-inclined mirror is thus added under the LCD screen 50 to reflect the light emitted therefrom to the first beam splitter BS/RP1. As described above in relation with FIG. 6, adding the mirror 60 makes the whole design more compact by removing the vertical structure under the table, the vertical structure being replaced by a flat horizontally positioned LCD screen that takes almost no space and by a mirror extending in a diagonal under the table and thus allowing some more space under the table for people's feet or other objects.

Figure 9:
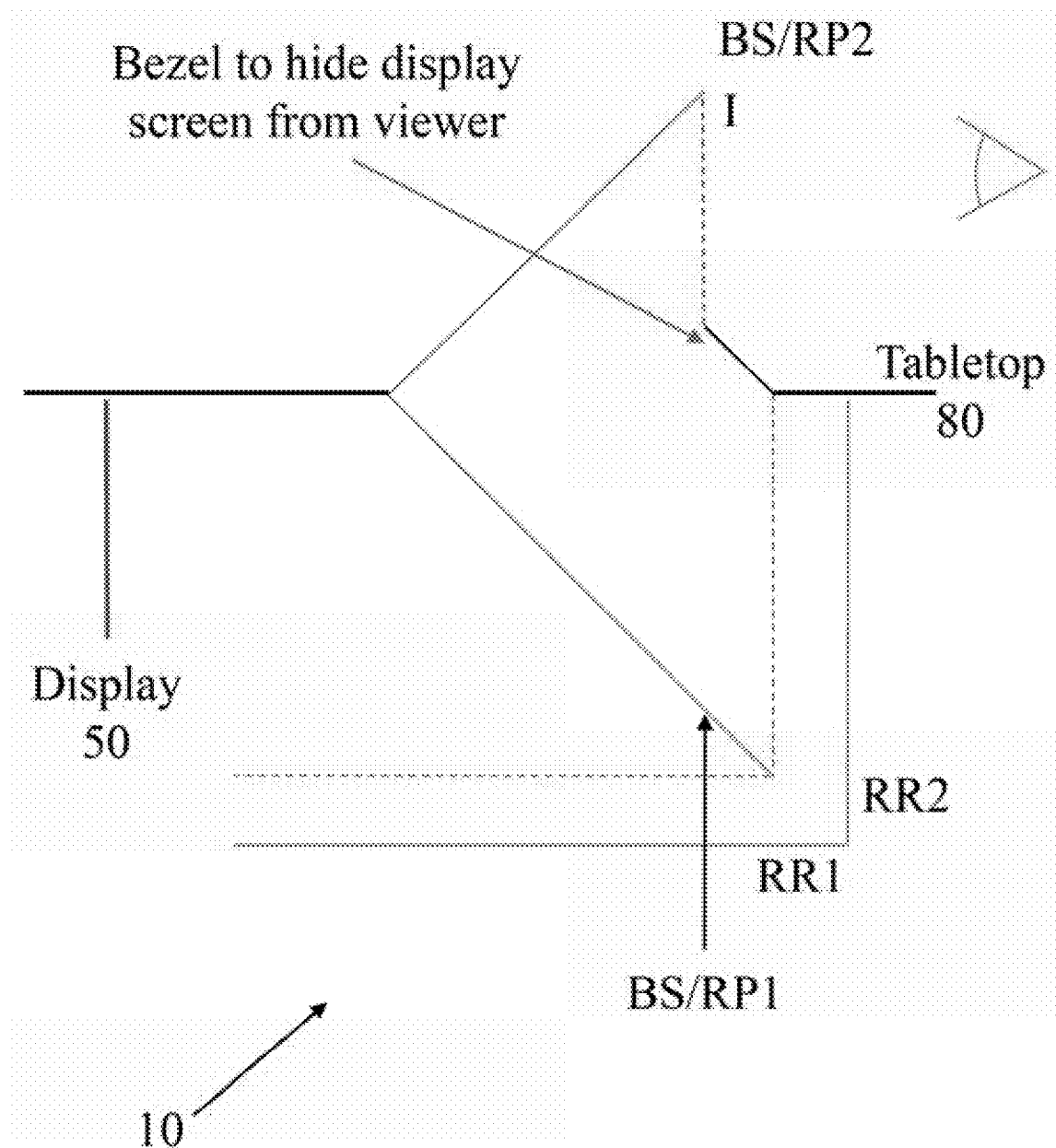
FIG. 9 is a schematic diagram illustrating the embodiment of FIG. 7, wherein a bezel is used to hide the display screen from the viewer.

The embodiment of FIG. 7 has a disadvantage of providing the LCD screen 50 within the field of view of the viewer. This can bother or even confuse the viewer because image sources are conflicting. FIG. 9 shows an embodiment similar to the one shown in FIG. 7, with an additional bezel 85 provided by the tabletop surface 80. The bezel 85 is an edge portion of the tabletop surface which extends from the tabletop surface 80 but with a non-zero inclination with the surface. The bezel 85 has a position and inclination that blocks direct viewing of the LCD screen 50 in the field of view of the viewer. The bezel 85 thus prevents viewing the LCD screen 50 directly while not affecting the aerial image as viewed by the viewer.

Figure 10:
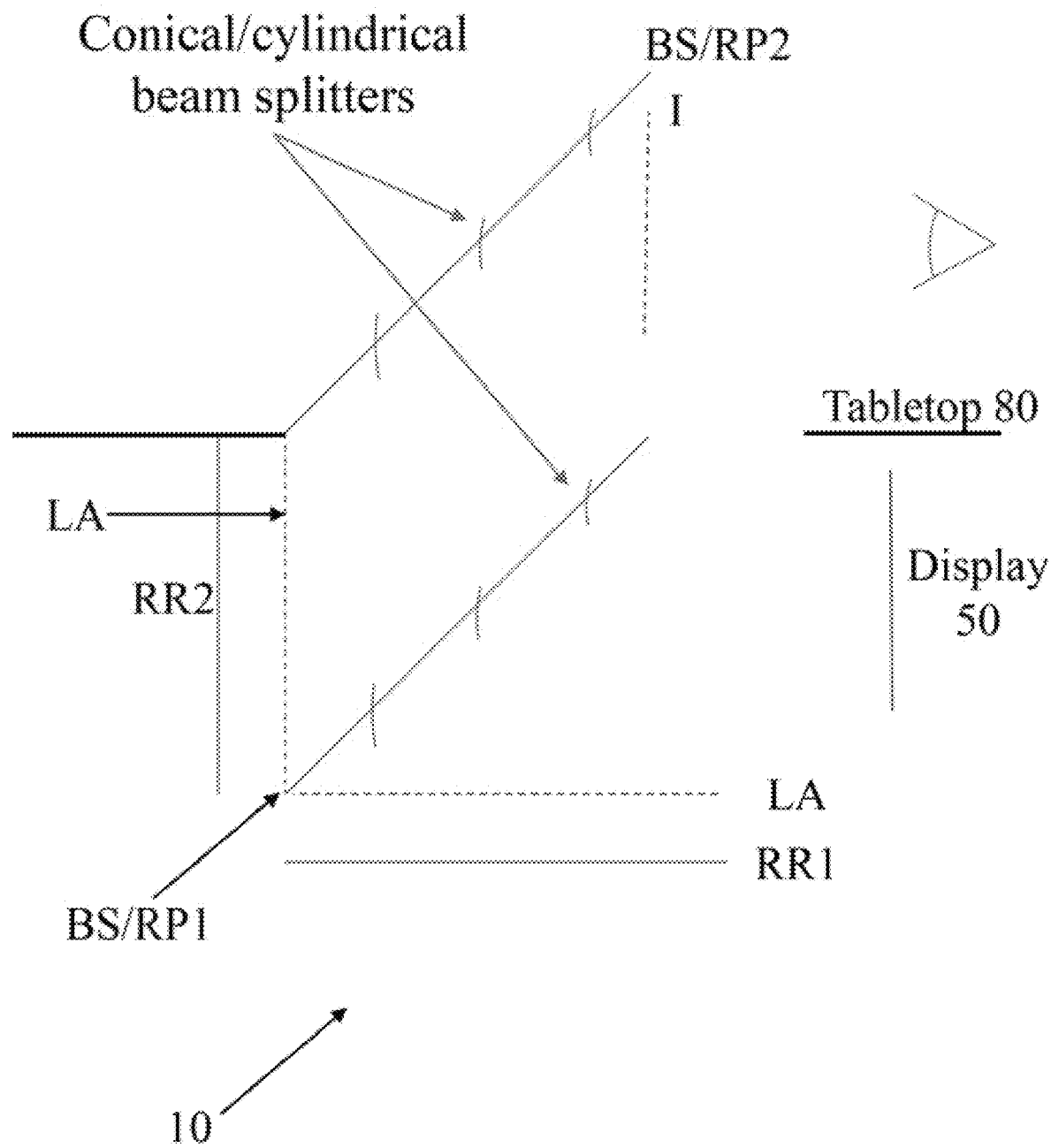
FIG. 10 is a schematic diagram illustrating the embodiment of FIG. 4, wherein the beam splitters are conical or cylindrical.

According to an embodiment of the aerial image display apparatus 10, as shown in FIG. 10, the beam splitters BS can have a conical shape. They can also have a cylindrical shape. The symbol used in FIG. 10 suggests any one of these two shapes. This shape can be used to widen the beam splitter and thus widen the field of view of the viewer for a more immersive experience. Providing two beam splitters with the same conical or cylindrical shape is useful to arrive at an aerial image presenting less distortion, as these shapes can correct imperfections in the projection, compared to planar optical elements that can also be used.

Figure 11:
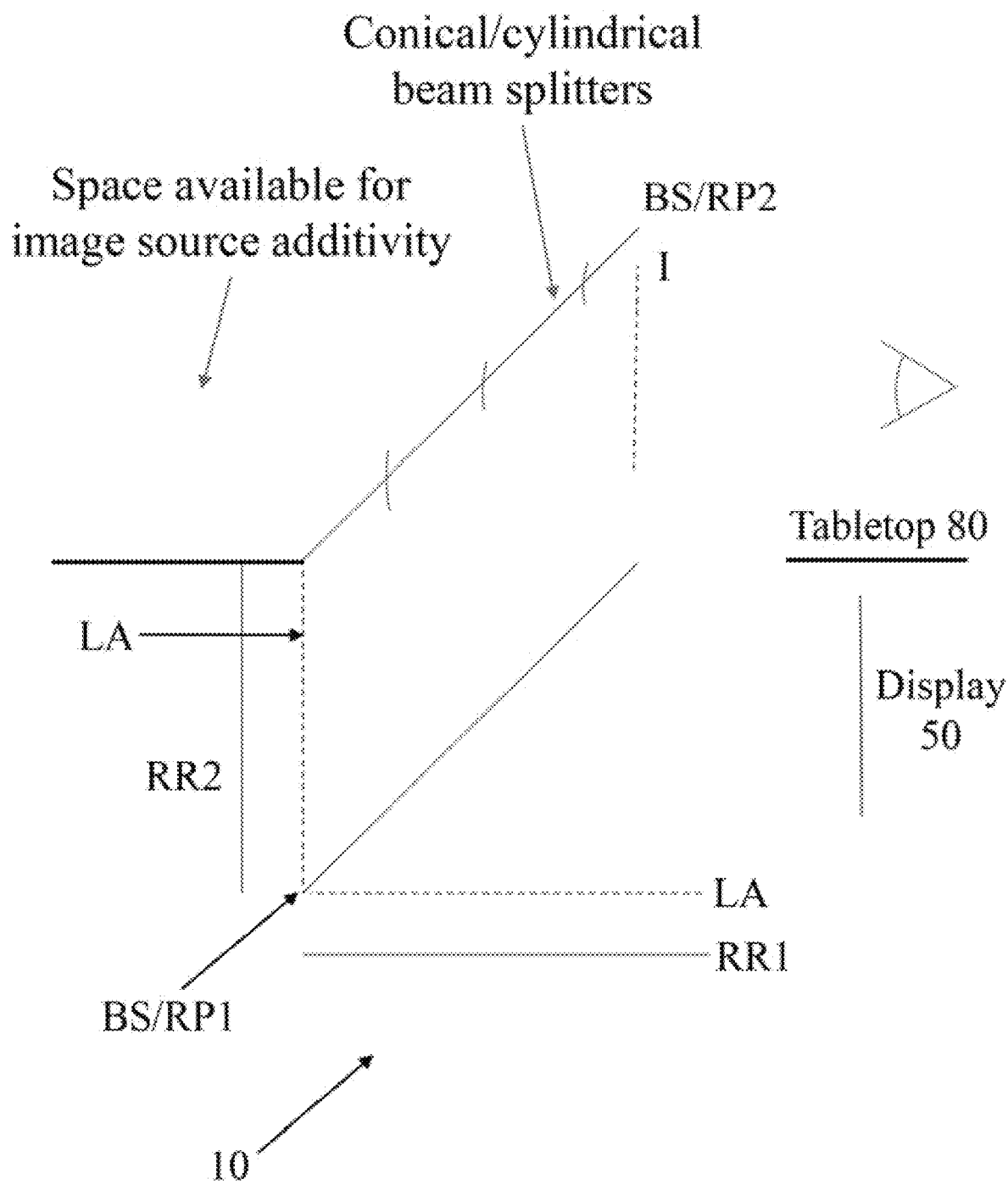
FIG. 11 is a schematic diagram illustrating the embodiment of FIG. 4, wherein one of the beam splitters is conical or cylindrical.

According to another embodiment of the aerial image display apparatus 10 shown in FIG. 11, only one of the beam splitters, preferably the second beam splitter that is viewed directly by the viewer, has a conical shape, or a cylindrical shape (the other one being planar). Again, this shape can be used to widen the beam splitter viewed directly by the viewer and thus widen the field of view of the viewer for a more immersive experience. For greater clarity, in FIGS. 10-11, the cross-section of the beam splitters is illustrated.

Figure 12:
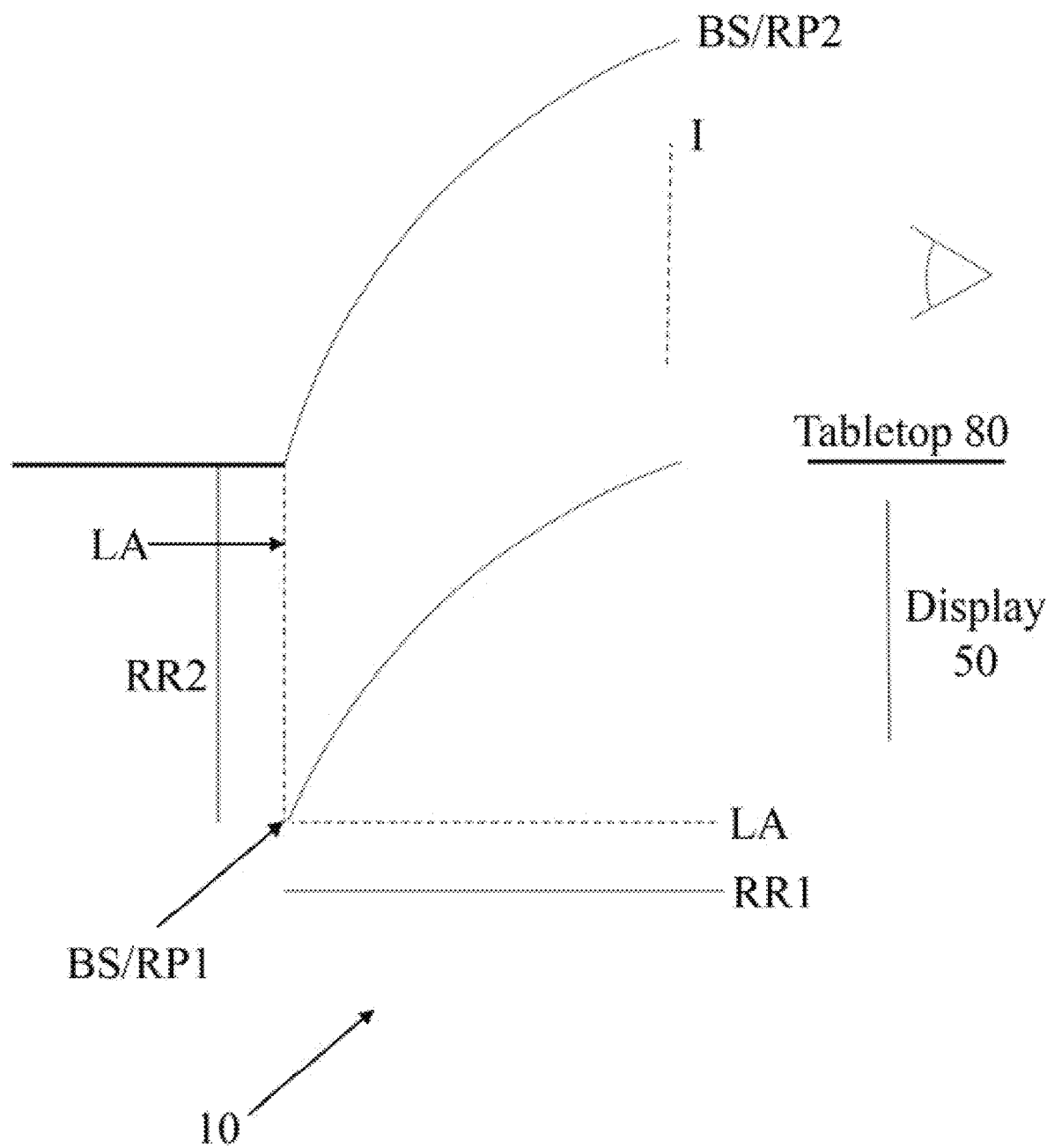
FIG. 12 is a schematic diagram illustrating the embodiment of FIG. 4, wherein the beam splitters or reflective polarizers are curved, such as spherical or ellipsoidal.

Similarly, and according to another embodiment of the aerial image display apparatus 10 as shown in FIG. 12, the beam splitters can have a circular or ellipsoidal shape. For greater clarity, in FIG. 12, the cross-section of the beam splitters is illustrated.

Although the term retroreflector has been widely used above, it should be recognized that the embodiment shown in FIGS. 4-12 use retroreflective sheeting. Retroreflective sheeting refers to an object having an exposed surface that is engineered to present a plurality of small retroreflectors on its surface. This surface is thus engineered to provide a matrix, or 2D-array, of retroreflectors that are individually very small. The resolution of this matrix depends on the size (e.g., length of a side) of each individual retroreflector on the retroreflective sheeting.

Figure 13A:
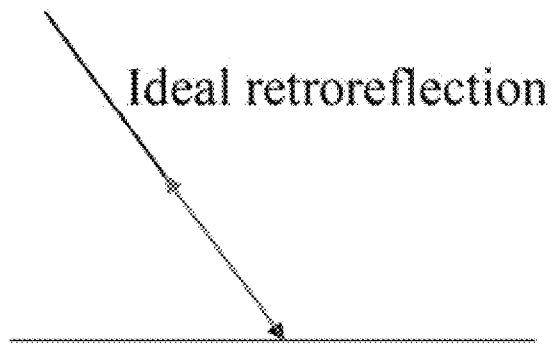
FIGS. 13A-13C are schematic diagrams illustrating ideal retroreflection, an offset of the retroreflected light rays, and angular spread of the retroreflected light rays, respectively.
Figure 13B:
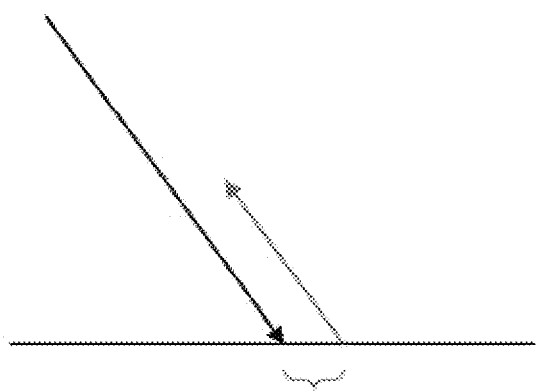
Figure 13C:
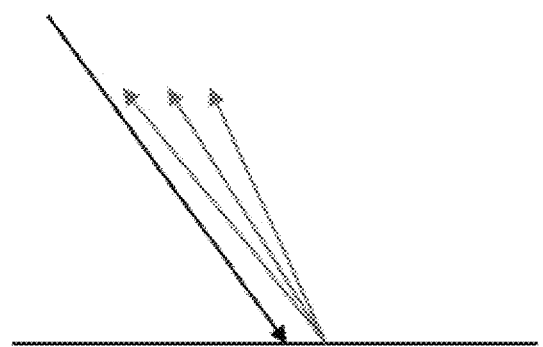

As mentioned above, a lens array is preferably provided over each retroreflector, or more accurately, retroreflective sheeting, to achieve greater imaging accuracy in the aerial image. Indeed, real-life retroreflectors suffer from imperfections. An ideal retroreflector is shown in FIG. 13A. However, the size of the retroreflector has an impact on the reflected light ray, which is reflected with an offset (in translation) from the retroreflector. In other words, as shown in FIG. 13B, the retroreflected light ray is reflected in the exact same direction, but translated in space depending on the retroreflector size. This is why a retroreflective sheeting made of a high number of small retroreflectors is used in the display, instead of a single large retroreflector. In addition to this imperfection, the retroreflected light rays are in fact not reflected in the exact same direction as the incident beam. Retroreflected light rays from the incident light beam are reflected with an angular spread, as shown in FIG. 13C.

Figure 13D:
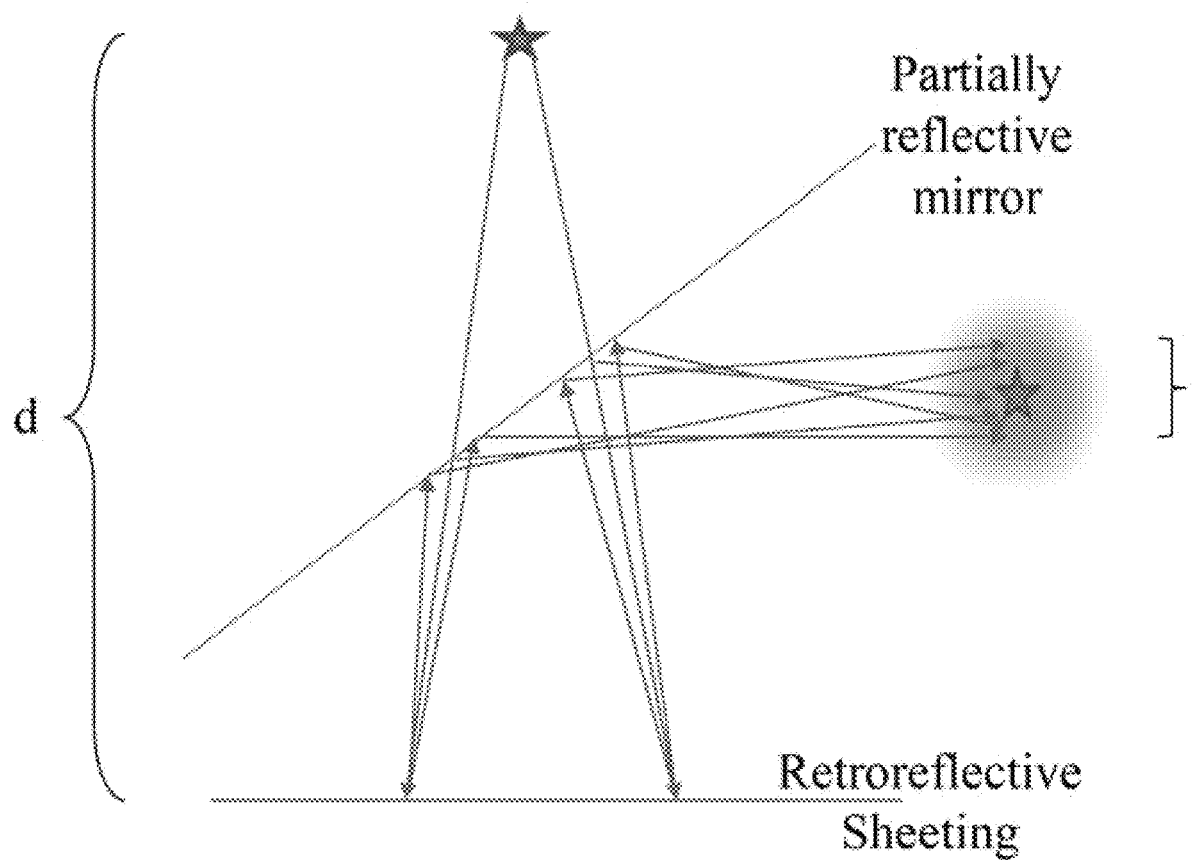
FIG. 13D is a schematic diagram illustrating an aerial image display suffering from the imperfections illustrated in FIGS. 13B-13C.

These imperfections have an impact on the quality of the aerial image produced by the aerial image display apparatus 10 from the LCD screen. This is shown in FIG. 13D, where the aerial image produced from an object is blurred. Aerial image displays from the prior art indeed suffer from blurriness, partly for this reason.

The embodiments described herein make use of a lens array LA in combination with each retroreflective sheeting to ensure that the imperfections are corrected to reduce blurriness and thus improve the accuracy of the aerial image as a faithful reproduction of the object, i.e., the LCD screen.

Figure 14A:
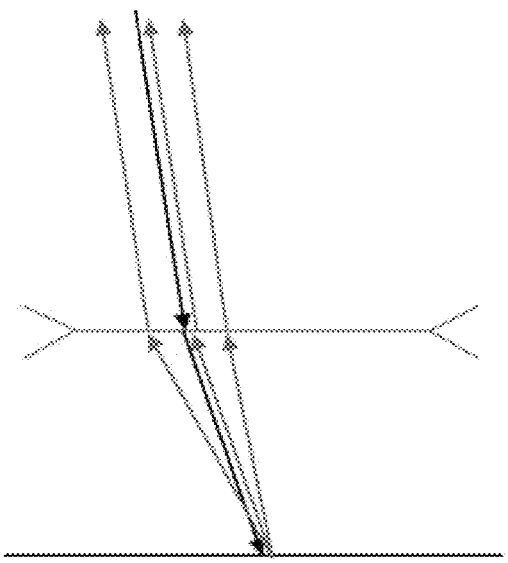
FIG. 14A is a schematic diagram illustrating a lens positioned above a retroreflector for correcting the imperfections illustrated in FIGS. 13B-13C.
Figure 14B:
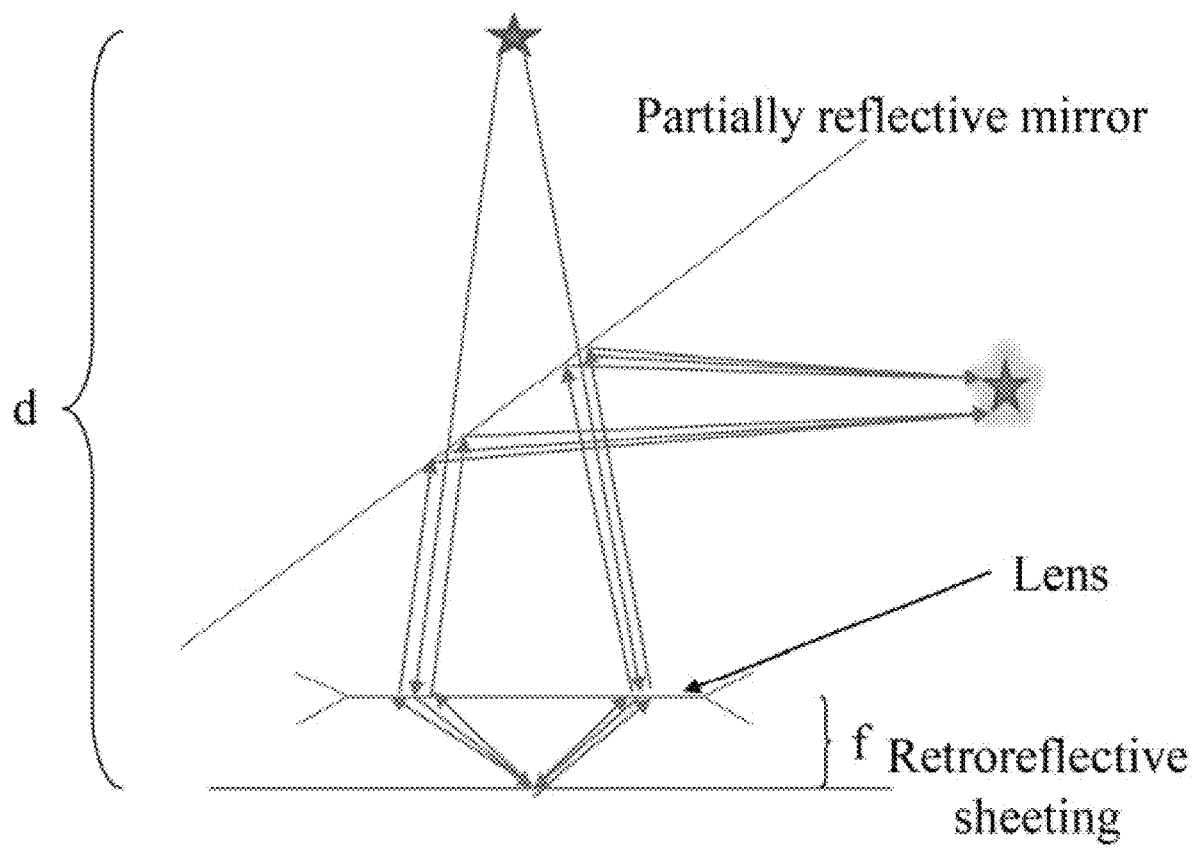
FIG. 14B is a schematic diagram illustrating an aerial image display corrected by the lens of FIG. 14A, according to an embodiment.

FIG. 14A illustrates that a lens positioned over a retroreflector can correct the angular spread of a light beam from this retroreflector. Indeed, the retroreflected light rays from the same incoming beam have an angular spread right after reflection on the retroreflector, but as they reach the lens after reflection, they are brought to the same direction. The offset between these now parallel rays is present and thus not corrected by the lens, but the angular spread has a greater contribution to the total error on imaging. Since angular spread is corrected by the lens, the most significant cause of error on the aerial image is prevented and the aerial image is a more accurate reproduction of the original object as displayed by the LCD screen 50, as shown in FIG. 14B.

Figure 15A:
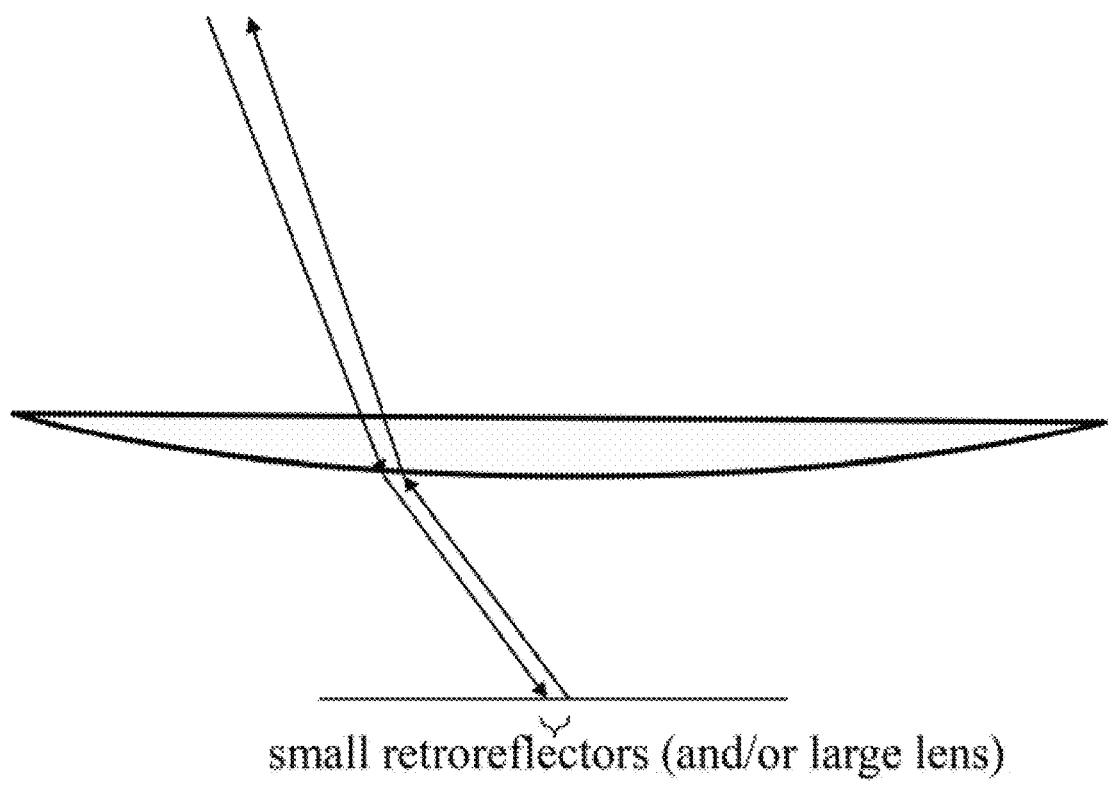
FIGS. 15A-15B are schematic diagrams illustrating how the relative sizes of the lens and the retroreflector affect the effectiveness of correction.
Figure 15B:
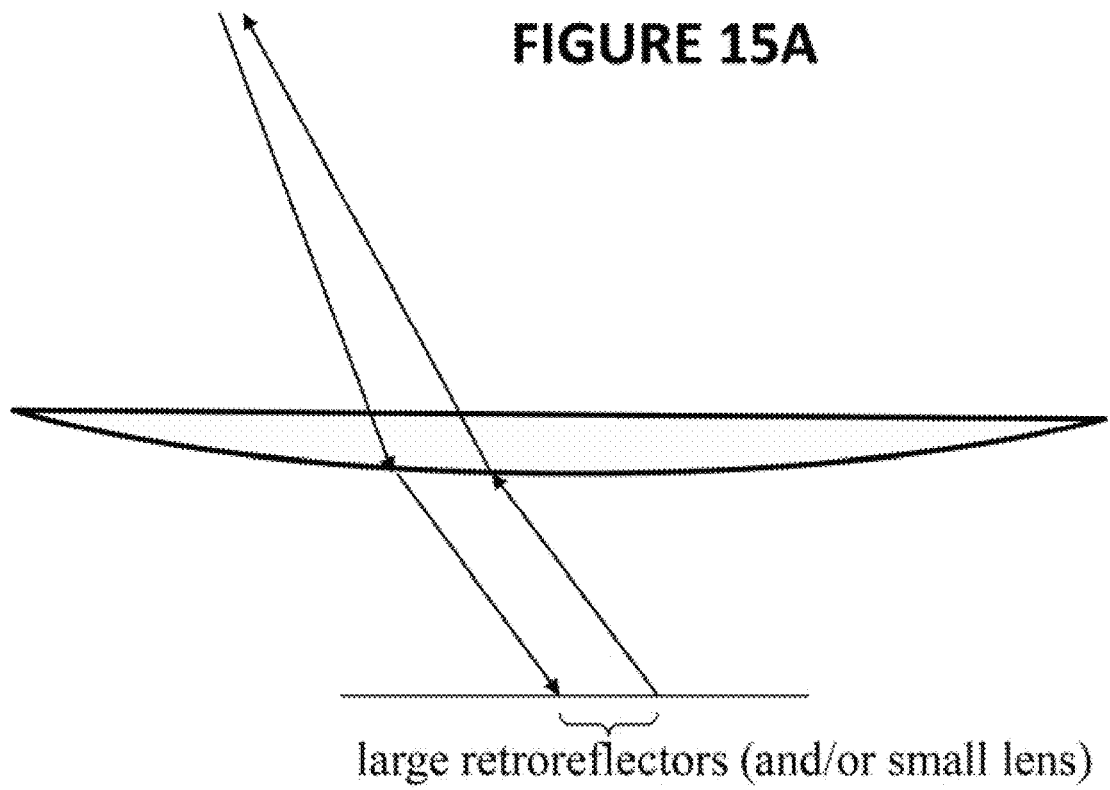

The lens must however be substantially larger than the size of the retroreflector on the retroreflective sheeting for the correction to be present. This is shown in FIGS. 15A-15B, where a lens that is too small in comparison with the retroreflector is not able to sufficiently bring the angular spread light rays back to the same direction.

By providing the lens in an array, each retroreflector in the retroreflective sheeting will have its reflected light rays corrected by one of the lenses in the lens array LA. The result is therefore higher resolution in the aerial image I, this higher resolution further causing the aerial image I to appear brighter and to be more aesthetically pleasing to the viewer.

The aerial image display apparatus 10 can comprise, in addition to the display 50 and to the various optical elements, a structure, such as a frame or an enclosure, for making the apparatus 10 an object that can be installed and handled and for holding all the components in their desired configuration.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A display apparatus for producing, in a field of view of a viewer, an aerial image of an object, the display apparatus comprising:
   a display acting as the object to be imaged;
   a first beam splitter receiving light from the display and redirecting at least a portion of the light;
   a first retroreflective sheeting, which is a sheeting comprising a plurality of retroflectors on a surface thereof, for performing a retroreflection of the light redirected by the first beam splitter or reflective polarizer;
   a second beam splitter for receiving the light retroreflected by the first retroreflective sheeting and which produces the aerial image, the second beam splitter being aligned with a point of view of the viewer, thus defining a horizon of the field of view; and
   a surface extending below the horizon,
   wherein the first beam splitter or reflective polarizer, the first retroreflective sheeting and the display are located under the surface and therefore below the horizon defined by the second beam splitter under which the surface extends, to produce the aerial image between the second beam splitter and the point of view of the viewer,
   wherein both the first beam splitter and the second beam splitter are: conical beam splitters, or cylindrical beam splitters, or spherical beam splitters.

2. The display apparatus of claim 1, further comprising a lens array installed over the first retroreflective sheeting.

3. The display apparatus of claim 1, further comprising a second retroreflective sheeting, wherein the first beam splitter is for transmitting light from the display to the second retroreflective sheeting and for directing light from the second retroreflective sheeting to the second beam splitter or reflective polarizer.

4. The display apparatus of claim 3, further comprising a lens array installed over the first retroreflective sheeting and the second retroreflective sheeting.

5. The display apparatus of claim 1, wherein the surface is opaque on at least a portion thereof to block a portion of the field of view to define a hidden portion thereunder, wherein the display is located in the hidden portion.

6. The display apparatus of claim 5, wherein the surface comprises an opening in an optical path between the first beam splitter and the second beam splitter or reflective polarizer, the opening defining a proximal portion of the surface and a distal portion of the surface with respect to the point of view of the viewer, wherein the display is installed under the proximal portion of the surface, wherein the first beam splitter and the second beam splitter are parallel.

7. The display apparatus of claim 6, further comprising a mirror in an optical path between the display and the first beam splitter for reflecting the light from the display, wherein the display is installed substantially horizontally under the proximal portion of the surface.

8. The display apparatus of claim 5, wherein the surface comprises an opening in an optical path between the first beam splitter and the second beam splitter or reflective polarizer, the opening defining a proximal portion of the surface and a distal portion of the surface with respect to the point of view of the viewer, wherein the display is installed under the distal portion of the surface, wherein the first beam splitter and the second beam splitter are perpendicular.

9. The display apparatus of claim 8, further comprising a mirror in an optical path between the display and the first beam splitter for reflecting the light from the display, wherein the display is installed substantially horizontally under the surface.

10. The display apparatus of claim 9, wherein the surface is substantially parallel to the horizon and comprises a bezel that is inclined and extends away from the horizon for hiding the display from the point of view of the viewer.

11. The display apparatus of claim 1, wherein the display acting as the object to be imaged is a physical object or viewing device that can display 3D imagery, in order to create a three dimensional aerial image.

12. A method for producing, in a field of view of a viewer, an aerial image of an object, the method comprising:
    aligning a second beam splitter with a point of view of the viewer, thus defining a horizon of the field of view
    providing a display acting as the object to be imaged under an opaque surface extending below the horizon;
    using a first beam splitter located below the opaque surface, receiving light from the display and redirecting at least a portion of the light, wherein both the first beam splitter and the second beam splitter are: conical beam splitters, or cylindrical beam splitters, or spherical beam splitters;
    using a first retroreflective sheeting, which is a sheeting comprising a plurality of retroflectors on a surface thereof, located below the opaque surface, performing a retroreflection of the light redirected by the first beam splitter or reflective polarizer;
    using the second beam splitter or reflective polarizer, receiving the light retroreflected by the first retroreflective sheeting and producing the aerial image between the second beam splitter and the point of view of the viewer.

13. The method of claim 12, further comprising correcting the retroreflection using a lens array installed over the first retroreflective sheeting.

14. The method of claim 12, further comprising using a second retroreflective sheeting to further perform the retroreflection, wherein the first beam splitter is for transmitting light from the screen display to the second retroreflective sheeting and for directing light from the second retroreflective sheeting to the second beam splitter or reflective polarizer.

15. The method of claim 14, further comprising correcting the retroreflection using a lens array installed over the first retroreflective sheeting and the second retroreflective sheeting.

16. The method of claim 12, wherein the display acting as the object to be imaged is a physical object or viewing device that can display 3D imagery, in order to create a three dimensional aerial image.

* * * * *